(12) United States Patent
Qie et al.

(10) Patent No.: US 11,921,776 B2
(45) Date of Patent: Mar. 5, 2024

(54) SURFACE MOUNT DATA CONVERSION METHOD, SYSTEM, MEDIUM AND DEVICE BASED ON COMPONENT THREE-DIMENSIONAL DATABASE

(71) Applicant: VAYO (SHANGHAI) TECHNOLOGY CO., LTD., Shanghai (CN)

(72) Inventors: Guoliang Qie, Shanghai (CN); Jihong Wu, Shanghai (CN); Shengjie Qian, Shanghai (CN); Yongjian Qu, Shanghai (CN)

(73) Assignee: CHINA RESOURCES MICROELECTRONICS (CHONGQING) CO. LTD., Chongqing (CN)

( * ) Notice: Subject to any disclaimer, the term of this patent is extended or adjusted under 35 U.S.C. 154(b) by 212 days.

(21) Appl. No.: 17/431,088

(22) PCT Filed: Dec. 18, 2019

(86) PCT No.: PCT/CN2019/126307
§ 371 (c)(1),
(2) Date: Aug. 13, 2021

(87) PCT Pub. No.: WO2020/164307
PCT Pub. Date: Aug. 20, 2020

(65) Prior Publication Data
US 2022/0309094 A1    Sep. 29, 2022

(30) Foreign Application Priority Data
Feb. 14, 2019    (CN) .......................... 201910113419.0

(51) Int. Cl.
*G06F 16/00*    (2019.01)
*G06F 16/583*    (2019.01)
*G06F 30/392*    (2020.01)

(52) U.S. Cl.
CPC .......... *G06F 16/583* (2019.01); *G06F 30/392* (2020.01)

(58) Field of Classification Search
CPC .... G06F 16/583; G06F 30/392; G06F 30/398; G06F 2115/12; G06F 2119/18; G06F 16/29; G06F 16/587
See application file for complete search history.

(56) References Cited

U.S. PATENT DOCUMENTS

| 2002/0046387 A1* | 4/2002 | Matsushita .......... H05K 3/0005 716/102 |
| 2006/0190114 A1* | 8/2006 | Tamura ................. G06F 30/392 700/98 |

(Continued)

FOREIGN PATENT DOCUMENTS

| CN | 106777756 A | 5/2017 |
| CN | 109885921 A | 6/2019 |

OTHER PUBLICATIONS

Jee Min Hong et al., "A Hierarchical Optimization Method in the PCB Assembly for Surface Mounting Machines", pp. 129-134 (Year: 1997).*

(Continued)

*Primary Examiner* — Jared M Bibbee
(74) *Attorney, Agent, or Firm* — Globlal IP Services; Tianhu Gu (57) ABSTRACT

The present disclosure provides a surface mount data conversion method, system, medium and apparatus based on a component three-dimensional database. The surface mount data conversion method based on a component three-dimensional database includes: creating a component 3D database (Continued)

---

S11 — Creating a component 3D database required in a circuit board designing stage and creating a production process template library required in a circuit board production stage S12 — Performing data conversion on the component 3D database and the production process template library to generate a component image library for use in the production stage required in a circuit board designing stage and creating a production process template library required in a circuit board production stage; and performing data conversion on the component 3D database and the production process template library to generate a component image library for use in the production stage. The present disclosure can avoid repeated work, achieve real-time update and match of production data, and reduce the error rate caused by the production data during circuit board production.

8 Claims, 3 Drawing Sheets

(56) References Cited

U.S. PATENT DOCUMENTS

| 2017/0031207 | A1* | 2/2017 | Li | B33Y 10/00 |
| 2017/0270831 | A1* | 9/2017 | Norikane | B33Y 70/10 |

OTHER PUBLICATIONS

Yang. Hongjie et al. CAPP System Assembled by PCB Based on CORBA Integrated Technology. Journal ofHuazhong University of Science and Technology vol. 29. No. 9. Sep. 30, 2001 (Sep. 30, 2001). ISSN: 1671-4512. sections 1-3. and figures 1 and 2.
Research and Development of CAPP System for the Assembly of Electronic Products China Master's Theses Full-text Database, information Science, Nov. 15, 2015 (Nov. 15, 2015) ISSN: 1674-0246. chapters 3 and 4.

* cited by examiner

SURFACE MOUNT DATA CONVERSION METHOD, SYSTEM, MEDIUM AND DEVICE BASED ON COMPONENT THREE-DIMENSIONAL DATABASE

CROSS REFERENCE TO RELATED PATENT APPLICATION

The present application is the US national stage of PCT/CN2019/126307 filed on Dec. 18, 2019, which claims the priority of the Chinese patent applications No. 201910113419.0 filed on Feb. 14, 2019, which application is incorporated herein by reference.

FIELD OF THE TECHNOLOGY

The present disclosure belongs to the technical field of electronics manufacturing, and relates to a conversion method and system, in particular, to a surface mount data conversion method, system, medium and device based on component three-dimensional database.

BACKGROUND

With the continuous progress of human technology and rapid development of the electronics industry, electronic products are undergoing very rapid development and change, and the demands for the reliability, high density and miniature size of PCBs are constantly increasing, resulting in increasingly higher density and design requirement on the PCBs. The requirement on electronic components is also becoming increasingly higher in the PCB manufacturing process, which involves stage of design, simulation, test, production and so on, and different information data of the electronic components will be used in these different stages. In conventional practice, the various stages are separated, which inevitably causes a waste of human resources and management difficulties, and workers involved in each stage are different, so the uniformity and accuracy of the data are difficult to guarantee.

Conventional operation methods in the industry have the following drawbacks: first, repetitive work is generated; second, real-time update and match cannot be achieved, so designed PCBs cannot be produced in time; and third, designers and production persons may be different, so same material codes may correspond to different device models, which is a very serious loophole.

With the accelerated upgrade of electronic products, the advance of intelligent manufacturing and Industry 4.0, and the popularity of the concepts of Internet+manufacturing and smart factory, the entire electronics manufacturing industry is looking for more efficient and reliable manufacturing methods and technologies. How to accelerate the conversion from design to production, and achieve the joint and unification of a component three-dimensional database and SMT component data have become particularly necessary in the PCB industry.

Therefore, it has become a technical problem to be solved by those skilled in the art to provide a surface mount data conversion method, system, medium and device based on a component three-dimensional database, so as to solve the problem that circuit board production data cannot be accurately acquired and avoid the shortcomings of repetitive work, production loopholes and the like.

SUMMARY

The present disclosure provides a surface mount data conversion method, system, medium and device based on a component three-dimensional database, so as to solve the problem that circuit board production data cannot be accurately acquired and avoid the problems of repetitive work and production loopholes.

The present disclosure provides a surface mount data conversion method based on a component three-dimensional database. The surface mount data conversion method based on component three-dimensional database includes: creating a component 3D database required in a circuit board designing stage and creating a production process template library required in a circuit board production stage; and performing data conversion on the component 3D database and the production process template library to generate a component image library for use in the production stage.

In an embodiment of the present disclosure, the creating of the component 3D database required in the circuit board designing stage includes:

acquiring design attribute information of components required in the circuit board designing stage; and aligning the design attribute information of the components to material code information of the components to generate the component 3D database required in the circuit board designing stage, and the design attribute information of the components include three-dimensional data, packaging information and/or working parameter information of the components.

In an embodiment of the present disclosure, the creating of the production process template library required in the circuit board production stage includes:

storing production process information of related components accumulated in the circuit board production stage to generate the production process template library required in the circuit board production stage; or generating production process information corresponding to the type or shape of components in the circuit board production stage to generate the production process template library required in the circuit board production stage.

In an embodiment of the present disclosure, the production process information corresponding to the type or shape of components in the circuit board production stage includes nozzle information, feeder information, camera information, and/or special setting information required for the process.

In an embodiment of the present disclosure, the performing of the data conversion on the component 3D database and the production process template library to generate the component image library for use in the production stage includes:

extracting three-dimensional models of components and production process data of components respectively, by using type information of the components as a connection relationship between the component 3D database and the production process template library; and performing one-to-one image data association between the three-dimensional models of the components and the production process data of the components to generate the component image library.

In an embodiment of the present disclosure, the production process template library includes different production process template libraries set for different production systems or a common production process template library set for different production systems.

In another aspect, the present disclosure provides a surface mount data conversion system based on a component three-dimensional database. The surface mount data conversion system based on a component three-dimensional database includes a database creation module and a conversion module. The database creation module creates a component 3D database required in a circuit board designing stage and creates a production process template library required in a circuit board production stage. The conversion module performs data conversion on the component 3D database and the production process template library to generate a component image library for use in the production stage.

In an embodiment of the present disclosure, the conversion module extracts three-dimensional models of components and production process data of components, respectively, by using type information of the components as a connection relationship between the component 3D database and the production process template library, and performs one-to-one image data association between the three-dimensional models of the components and the production process data of the components to generate the component image library.

In yet another aspect, the present disclosure provides a computer storage medium storing a computer program therein, wherein the computer program, when executed by a processor, implements the surface mount data conversion method based on a component three-dimensional database.

In the last aspect, the present disclosure provides a device, including a processor and a memory. The memory stores computer program, and the processor executes the computer program stored in the memory so that the device performs the surface mount data conversion method based on a component three-dimensional database.

As described above, the surface mount data conversion method, system, medium and device based on a component three-dimensional database described in the present disclosure have the following beneficial effects:

Compared with a traditional process, the surface mount data conversion method, system, medium and device based on a component three-dimensional database described in the present disclosure achieve that a lot of repetitive work can be omitted, and manual labor is replaced by automation, thereby saving 60%-80% of time compared with a conventional method; and the applications of electronic component data in the design stage and in the production stage are jointed, thus ensuring the uniformity and accuracy of data, and simplifying the management of the electronic component data; by combining three-dimensional data of electronic components in the design stage and production process data thereof, image library data is automatically generated for use in subsequent production, and compatibility is achieved for different production systems.

DESCRIPTION OF SYMBOLS OF COMPONENTS

2 Surface mount data conversion system based on component three-dimensional database
21 Database creation module
22 Conversion module
S11-S12 Steps of surface mount data conversion method based on component three-dimensional database

DETAILED DESCRIPTION OF THE EMBODIMENTS

Embodiments of the present disclosure will be described below with specific examples, and other advantages and effects of the present disclosure may be easily understood by those skilled in the art from the disclosure in the specification. The present disclosure may be carried out or applied in other different specific embodiments, and various modifications or changes may also be made to the details in the specification based on different ideas and applications without departing from the spirit of the present disclosure. It is to be noted that the following embodiment and features in the embodiments may be combined with each other without conflicts.

It is to be noted that drawings provided in the following embodiments only schematically illustrate the basic idea of the present disclosure, so the drawings only show components related to the present disclosure, and are not drawn according to the numbers, shapes and sizes of the components in actual implementation; the forms, numbers and proportions of the components in actual implementation may represent an arbitrary variant, and the layout of the components may be more complex.

Embodiment 1

This embodiment provides a surface mount data conversion method based on a component three-dimensional database. The surface mount data conversion method based on a component three-dimensional database includes: creating a component 3D database required in a circuit board designing stage and creating a production process template library required in a circuit board production stage; and performing data conversion on the component 3D database and the production process template library to generate a component image library for use in the production stage.

Figure 1:
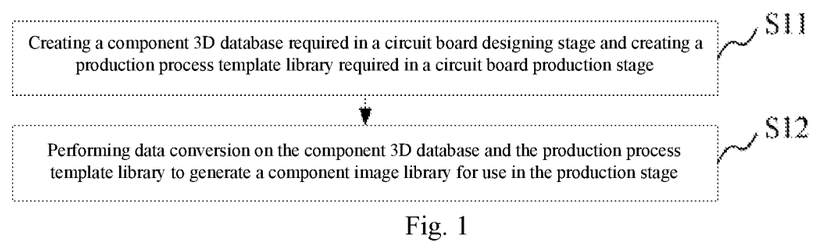
FIG. 1 shows a schematic flow diagram of a surface mount data conversion method based on a component three-dimensional database in an embodiment of the present disclosure.

The surface mount data conversion method based on a component three-dimensional database provided in this embodiment will be described below in detail in conjunction with the drawings. FIG. 1 shows a schematic flow diagram of a surface mount data conversion method based on a component three-dimensional database of the present disclosure in an embodiment. As shown in FIG. 1, the surface mount data conversion method based on a component three-dimensional database specifically includes the following steps.

S11, creating a component 3D database required in a circuit board designing stage and creating a production process template library required in a circuit board production stage.

In this embodiment, the steps of creating a component 3D database required in a circuit board designing stage include:
acquiring design attribute information of components required in the circuit board designing stage; and
aligning the design attribute information of the components to material code information of the components to generate the component 3D database required in the circuit board designing stage, and the design attribute information of the components includes three-dimensional data, packaging information and/or working parameter information of the components.

Specifically, the component 3D database may be entered manually or imported automatically by means of a template (Excel or other format), with data in the form of sql server.

In this embodiment, the steps of creating a production process template library required in a circuit board production stage include:
storing production process information of related components accumulated in the circuit board production stage to generate the production process template library required in the circuit board production stage; or
generating production process information corresponding to the type or shape of components in the circuit board production stage to form the production process template library required in the circuit board production stage.

In this embodiment, the production process information corresponding to the type or shape of components in the circuit board production stage includes nozzle information, feeder information, camera information, and/or special setting information required for the process.

The special setting information required for the process includes setting and canceling information of parameter information, and also includes default parameter set values for production.

The conversion relationship of production process data is determined by a configuration file. Part of the data is determined based on whether a certain parameter is required for surface mounting of a certain type of device, and other part of the data is default set values for customer.

In this embodiment, a feeder is an apparatus that supplies components to a mounter in the production line. The feeder may have many types, such as feed belts, feed trays, feed rods, etc. The mounter automatically selects one at a time for suction and surface mounting. The feeder information includes feed belt models, feed tray models, and feed rod models.

Specifically, the production process template library has two sources: firstly, the production process information of related components accumulated in the production process is stored in the production process template library, and secondly, for components not accumulated, production process information is generated by using a configuration table and stored in the production process template library.

The configuration table specifically indicates a corresponding relationship between component types (or shape identification) and production process information thereof.

Specifically, the function of the configuration table is to automatically recommend required process information according to currently known information such as device type, and size information. Judgment condition parameters in the recommendation are specified by a configuration file. For example, for a device that is 0.6 mm long and 0.3 mm wide, a feeder of "3×8 mm S 0201" is assigned and a nozzle of 906 RV is selected for this size.

S12, performing data conversion on the component 3D database and the production process template library to generate a component image library for use in the production stage.

In this embodiment, the steps of performing data conversion on the component 3D database and the production process template library to generate the component image library for use in the production stage include:
extracting three-dimensional models of components and production process data of components, respectively, by using type information of the components as a connection relationship between the component 3D database and the production process template library; and
performing one-to-one image data association between the three-dimensional models of the components and the production process data of the components to generate the component image library.

In this embodiment, data converted and generated for the image library is stored in an MDB file of a database and transferred to system software of a mounter used for circuit board production.

Specifically, using a mounter of ASM as an example, the image library is saved to a sql server database associated with system software thereof. An MDB file is provided in this embodiment to temporarily store the data.

Figure 2:
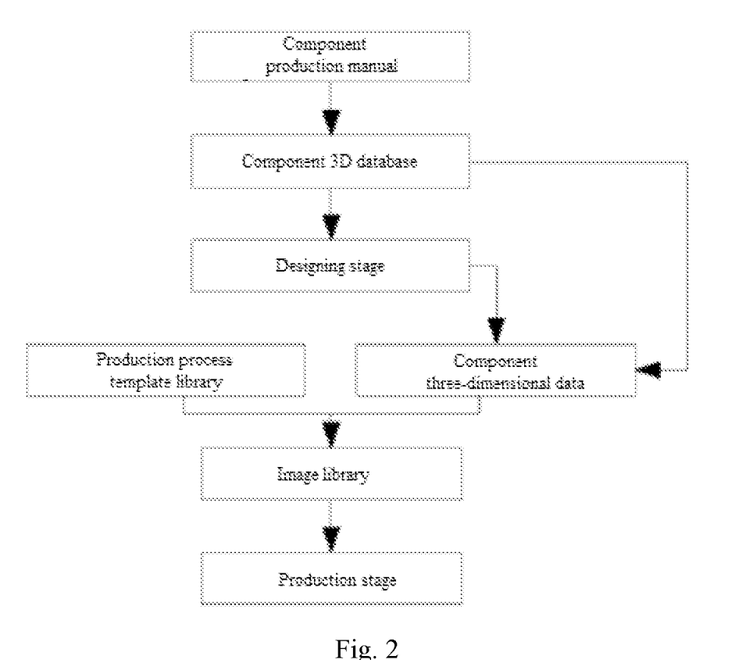
FIG. 2 shows a flow diagram of a surface mount data conversion method based on a component three-dimensional database in an embodiment of the present disclosure.

Specifically, after the image library required in the production stage is generated by combining the three-dimensional data of the components and the production process information of the components, the component data in the component 3D database is output for design and simulation in the design stage, and the component image library is output for use in the production stage. FIG. 2 shows a flow diagram of a surface mount data conversion method based on a component three-dimensional database in an embodiment of the present disclosure.

The design stage involves a PCB design and simulation process. Information such as the three-dimensional data, packaging information, and working parameters of the components need to be used in the PCB design process. The three-dimensional data, packaging information, working parameters and the like of the components may be obtained from a product manual provided by a supplier, and the information is aligned to material codes thereof to generate the component 3D database. In addition, the three-dimensional data of components may also be output from the subsequent design and simulation process in addition to output from the component 3D database. The three-dimensional data, packaging information and the like of the components in the component 3D database are applied to the design process, and the working parameters and the like are applied to the simulation process.

The production stage indicates the circuit board production operations carried out by using the component image library, specifically including the following steps:
exporting a list of the component type information through system software of a mounter;
searching the list of component type information in the image library according to the component type, and searching for image library information of the components from a sql server database; and
importing the image library information of the components into the circuit board production process according to the search result, the image library information of the components is device information required in production, which is generated by combining data from the component 3D database and data from the production process template library, and includes component shapes, identification types, surface-mount-related configuration parameters, and the like.

In this embodiment, the production process template library includes different production process template libraries set for different production systems or a common production process template library set for different production systems.

Figure 3:
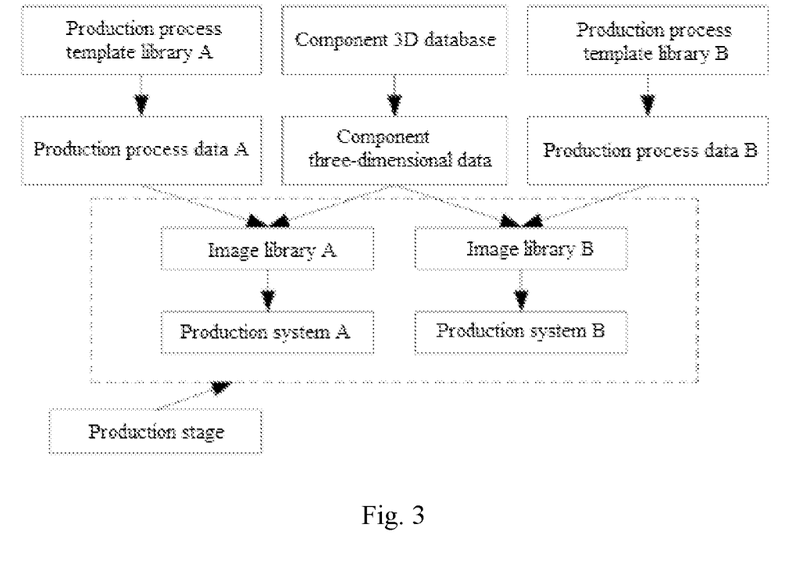
FIG. 3 shows a structure diagram of many-to-many production systems using a surface mount data conversion method based on a component three-dimensional database in an embodiment of the present disclosure.
Figure 4:
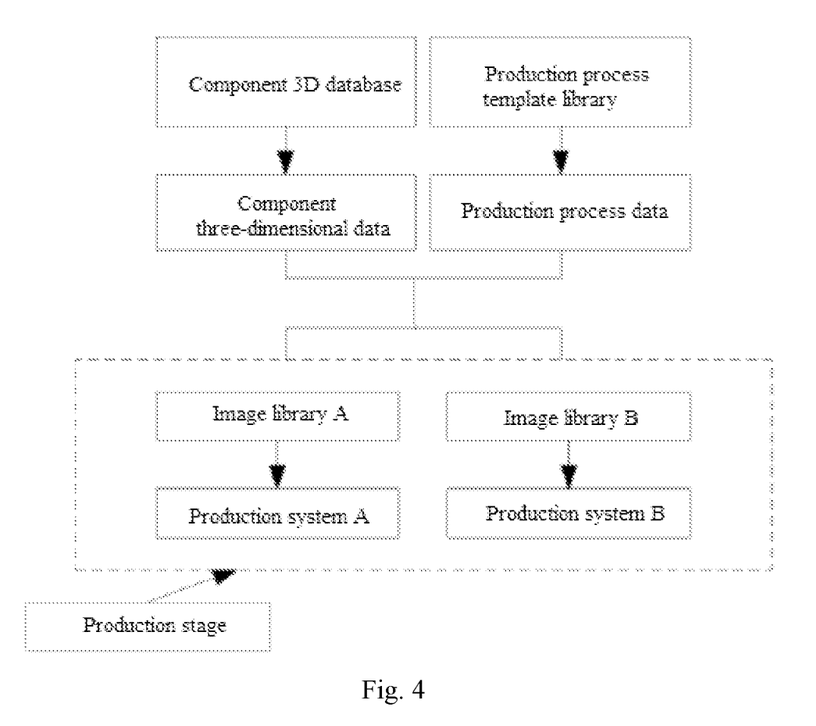
FIG. 4 shows a structure diagram of one-to-many production systems using a surface mount data conversion method based on a component three-dimensional database in an embodiment of the present disclosure.

Specifically, this embodiment provides two application solutions of multiple production systems. Referring to FIGS. 3 and 4, FIG. 3 shows a structure diagram of many-to-many production systems using a surface mount data conversion method based on a component three-dimensional database in an embodiment of the present disclosure, and FIG. 4 shows a structure diagram of one-to-many production systems using a surface mount data conversion method based on a component three-dimensional database in an embodiment of the present disclosure.

As shown in FIG. 3, the first solution involves conversion with multiple production systems and multiple template libraries.

In the case of multiple production systems, different production process template libraries are set for different production systems because the systems need different production processes and have different contents.

Component three-dimensional data is retrieved from the component 3D database, and respective production process data is retrieved from different production process template libraries, and the data is combined to generate multiple image libraries for different production systems. At the same time, the production systems may also update the production process template libraries.

As shown in FIG. 4, the second solution involves conversion with multiple production systems and a common template library.

In the case of multiple production systems, it is also possible to set only one production process template library and differentiate all production process information therein according to different production systems.

Component three-dimensional data is retrieved from the component 3D database, and corresponding production process data is retrieved from the production process template library, and the component three-dimensional data and the production process data are combined according to production system categories to generate image libraries to be applied to different production systems. At the same time, the production systems may also update the production process template library.

In this embodiment, a Siplace Pro system from Siemens is used as an example of the production system, and two production data conversion modes are available.

In an aspect, a manual conversion mode is adopted, and dimensional data, parameter data and the like of electronic components are acquired from production manuals of electronic components provided by suppliers and entered into the component 3D database.

Component three-dimensional data is retrieved from the component 3D database.

Components to be converted are manually entered or a related file is imported to generate a list of components to be converted.

The component three-dimensional data is converted into graphical information according to the list of components to be converted, and production process data (feeding, camera, nozzle, surface mount etc.) is extracted from the production process template library. The conversion is performed according to a given condition. The given condition is component type information required for a certain circuit board during production of the circuit board, and the component type information is pre-stored in the component 3D database.

A conversion result is viewed, a conversion report is output, and the conversion result is output through an API interface of the Siplace Pro system to component, and component shape libraries of the Siplace Pro system in the production stage for subsequent production.

In the other aspect, an automatic conversion mode is adopted, and dimensional data, parameter data and the like of electronic components are acquired from production manuals of electronic components provided by suppliers and entered into the component 3D database, and at the same time, entry time is recorded.

Component three-dimensional data is retrieved from the component 3D database.

Components created from the last conversion time are automatically searched for at regular timing according to a set auto-conversion cycle to obtain a conversion list.

The component three-dimensional data is converted into graphical information according to the list of components to be converted, and production process data (feeding, camera, nozzle, surface mounting, etc.) is extracted from the production process template library. The conversion is performed according to a given condition. The given condition is component type information required for a certain circuit board during production of the circuit board, and the component type information is pre-stored in the component 3D database.

A conversion result is viewed, a conversion report is output, and the conversion result is output through an API interface of the Siplace Pro system to component, and component shape libraries of the Siplace Pro system in the production stage for subsequent production.

An unsuccessful conversion report is output to the manual conversion mode.

This embodiment provides a computer storage medium storing a computer program therein, and the computer program, when executed by a processor, implements the surface mount data conversion method based on a component three-dimensional database.

It may be appreciated by those of ordinary skill in the art that all or some of the steps that implement the method embodiments described above may be accomplished by hardware related to the computer program. The aforementioned computer program may be stored in a computer readable storage medium. The steps including the method embodiments described above are performed when the program is executed; and the aforementioned storage medium includes ROM, RAM, magnetic disk, optical disk or any of other various media that can store program codes.

Compared with a traditional process, the surface mount data conversion method based on a component three-dimensional database described in this embodiment achieves that a lot of repetitive work can be omitted in the present disclosure, and manual labor is replaced by automation, thereby saving 60%-80% of time compared with a previous method; and the applications of electronic component data in the design stage and in the production stage are jointed, thus ensuring the uniformity and accuracy of data, and also achieving compatibility for different production systems. Furthermore, the management of electronic component data is also optimized.

Embodiment 2

This embodiment provides a surface mount data conversion system based on a component three-dimensional database. The surface mount data conversion system based on a component three-dimensional database includes:

a database creation module configured to create a component 3D database required in a circuit board designing stage and create a production process template library required in a circuit board production stage; and  a conversion module configured to perform data conversion on the component 3D database and the production process template library to generate a component image library for use in the production stage.

The surface mount data conversion system based on a component three-dimensional database provided in this embodiment will be described below in detail in conjunction with the drawings. It is to be noted that it should be understood that the division of the modules of the following system is only a logical functional division, and in actual implementation, all or part of the modules may be integrated into one physical entity or physically separated. Moreover, these modules may be all embodied in the form of software called by a processing component, or all embodied in the form of hardware, or some of the modules may be embodied in the form of software called by a processing component and some of the modules may be embodied in the form of hardware. For example, a module x may be a stand-alone processing component, or may also be implemented by being integrated into a chip of the system described below. In addition, the module x may also be stored in the form of program codes in a memory of the following system, and the program code may be called by a processing component of the following system to perform the function of the following module x. Other modules are embodied similarly. All or part of these modules may be integrated together, or the modules may be embodied independently. The processing component here may be an integrated circuit with signal processing capability. During implementation, the steps of the above-mentioned method or the following modules may be accomplished by an integrated logic circuit in the form of hardware or instructions in the form of software in the processor component. The following modules may be one or more integrated circuits configured to implement the above method, e.g., one or more application specific integrated circuits (ASICs), one or more microprocessors (digital signal processors, DSPs), one or more field programmable gate arrays (FPGAs), or the like. When a module described below is embodied in the form of program codes called by a processing component, the processing component may be a general-purpose processor such as a central processing unit (CPU) or other processor able to call the program codes. These modules may be integrated together and embodied in the form of a system-on-a-chip (SOC).

Figure 5:
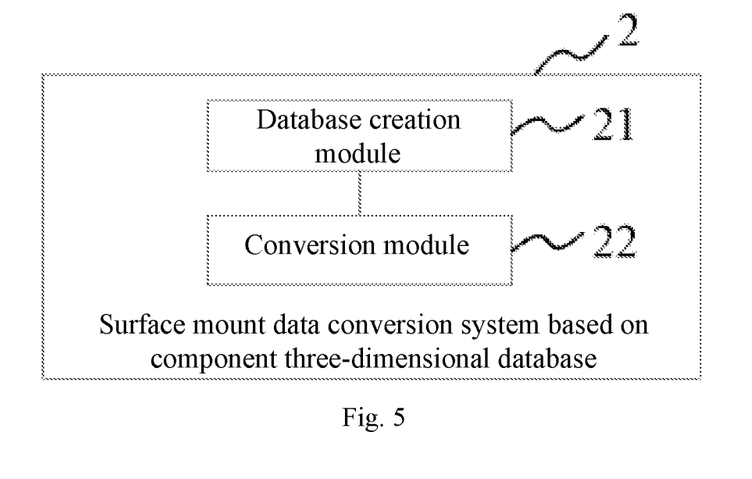
FIG. 5 shows a schematic structure diagram of a surface mount data conversion method based on a component three-dimensional database in an embodiment of the present disclosure.

Please refer to FIG. 5, which shows a schematic structure diagram of a surface mount data conversion method based on a component three-dimensional database of the present disclosure in an embodiment. As shown in FIG. 5, the surface mount data conversion system 2 based on a component three-dimensional database includes a database creation module 21 and a conversion module 22.

In this embodiment, a required component 3D database and a production process template library required in a circuit board production stage are created by using the database creation module 21; and  data conversion is performed on the component 3D database and the production process template library by the conversion module 22 to generate a component image library for use in the production stage.

Embodiment 3

This embodiment provides a device, including a processor, a memory, a transceiver, a communication interface or/and a system bus, wherein the memory and the communication interface are connected to the processor and the transceiver through the system bus and communicate therewith; the memory is configured to store a computer program; the communication interface is configured to communicate with other devices; and the processor and the transceiver are configured to run the computer program so that the device performs the steps of the surface mount data conversion method based on a component three-dimensional database as described in embodiment 1.

The system bus mentioned above may be a peripheral component interconnect (PCI) bus or an extended industry standard architecture (EISA) bus, or the like. This system bus may be divided into an address bus, a data bus, a control bus, and the like. The communication interface is configured to implement communication between a database access apparatus and other devices (such as clients, read-write libraries and read-only libraries). The memory may include a random access memory (RAM), and may also include a non-volatile memory, such as at least one disk memory.

The above-mentioned processor may be a general-purpose processor, including a central processing unit (CPU), a network processor (NP), or the like; and may also be a digital signal processor (DSP), an application specific integrated circuit (ASIC), a field programmable gate array (FPGA) or other programmable logic device, a discrete gate or transistor logic device, or a discrete hardware component.

The protection scope of the surface mount data conversion method based on a component three-dimensional database described in the present disclosure is not limited to the order of execution of the steps listed in this embodiment, and all solutions achieved by adding, reducing, or replacing steps of the prior art according to the principles of the present disclosure are included in the protection scope of the present disclosure.

The present disclosure further provides a surface mount data conversion system based on a component three-dimensional database. The surface mount data conversion system based on a component three-dimensional database can implement the surface mount data conversion method based on a component three-dimensional database described in the present disclosure, but the apparatus for implementing the surface mount data conversion method based on a component three-dimensional database described in the present disclosure includes, but is not limited to, the structures of the surface mount data conversion system based on a component three-dimensional database listed in this embodiment, and all structural modifications and substitutions of the prior art according to the principles of the present disclosure are included in the protection scope of the present disclosure.

In summary, compared with a traditional process, the surface mount data conversion method, system, medium and apparatus based on a component three-dimensional database described in the present disclosure achieve that a lot of repetitive work can be omitted in the present disclosure, and manual labor is replaced by automation, thereby saving 60%-80% of time compared with a previous method; and the applications of electronic component data in the design stage and in the production stage are jointed, thus ensuring the uniformity and accuracy of data, and also achieving compatibility for different production systems. Furthermore, the management of electronic component data is also optimized. The present disclosure effectively overcomes various shortcomings of the prior art and has a high value for industrial use.

The above embodiments are merely illustrative of the principles of the present disclosure and effects thereof, and are not intended to limit the present disclosure. Any person skilled in the art can modify or change the above embodiments without departing from the spirit and scope of the present disclosure. Therefore, all equivalent modifications or changes made by those with general knowledge in the technical field without departing from the spirit and technical ideas disclosed in the present disclosure are still covered by the claims of the present disclosure.

What is claimed is:

1. A surface mount data conversion method based on a component three-dimensional database comprises:

creating a component 3D database required in a circuit board designing stage and creating a production process template library required in a circuit board production stage; and performing data conversion on the component 3D database and the production process template library to generate a component image library for use in the production stage;

wherein the creating of the component 3D database required in the circuit board designing stage comprises:

acquiring design attribute information of components required in the circuit board designing stage; and aligning the design attribute information of the components to material code information of the components to generate the component 3D database required in the circuit board designing stage, the design attribute information of the components comprising three-dimensional data, packaging information and/or working parameter information of the components.

2. The surface mount data conversion method based on a component three-dimensional database according to claim 1, wherein the creating of the production process template library required in the circuit board production stage comprises:

storing production process information of related components accumulated in the circuit board production stage to generate the production process template library required in the circuit board production stage; or generating production process information corresponding to a type or shape of components in the circuit board production stage to generate the production process template library required in the circuit board production stage.

3. The surface mount data conversion method based on a component three-dimensional database according to claim 2, wherein the production process information corresponding to the type or shape of components in the circuit board production stage comprises nozzle information, feeder information, camera information, and/or special setting information required for the process.

4. The surface mount data conversion method based on a component three-dimensional database according to claim 1, wherein the performing of the data conversion on the component 3D database and the production process template library to generate the component image library for use in the production stage comprises:

extracting three-dimensional models of components and production process data of components, respectively, by using type information of the components as a connection relationship between the component 3D database and the production process template library; and performing one-to-one image data association between the three-dimensional models of the components and the production process data of the components to generate the component image library.

5. The surface mount data conversion method based on a component three-dimensional database according to claim 1, wherein the production process template library comprises different production process template libraries set for different production systems or a common production process template library set for different production systems.

6. A surface mount data conversion system based on a component three-dimensional database comprises:

a database creation module, which creates a component 3D database required in a circuit board designing stage and creates a production process template library required in a circuit board production stage; and a conversion module, which performs data conversion on the component 3D database and the production process template library to generate a component image library for use in the production stage;

wherein the conversion module extracts three-dimensional models of components and production process data of components, respectively, by using type information of the components as a connection relationship between the component 3D database and the production process template library, and performs one-to-one image data association between the three-dimensional models of the components and the production process data of the components to generate the component image library;

wherein each of the database creation module, and the conversion module is one of an application specific integrated circuit, a digital signal processor, and a field programmable gate array; wherein the database creation module, and the conversion module are further integrated together in the form of a system-on-a-chip.

7. A non-transitory computer readable storage medium storing a computer program, wherein the computer program, when executed by a processor, implements the surface mount data conversion method based on a component three-dimensional database as in claim 1.

8. A device, comprising a processor and a memory, wherein the memory is configured to store a computer program, and the processor is configured to execute the computer program stored in the memory so that the device performs the surface mount data conversion method based on a component three-dimensional database as in claim 1.

* * * * *